United States Patent
Lamy et al.

(10) Patent No.: US 6,876,736 B2
(45) Date of Patent: Apr. 5, 2005

(54) CALL-ROUTING MECHANISM FOR AUTOMATICALLY PERFORMING NUMBER SUBSTITUTION IN AN INTEGRATED ACCESS DEVICE

(75) Inventors: Michael F. Lamy, Huntsville, AL (US); Paul Graves McElroy, Huntsville, AL (US); Charles A. Wilson, Huntsville, AL (US); Arthur Edward Aldridge, Harvest, AL (US)

(73) Assignee: Adtran, Inc., Huntsville, AL (US)

( * ) Notice: Subject to any disclaimer, the term of this patent is extended or adjusted under 35 U.S.C. 154(b) by 480 days.

(21) Appl. No.: 09/981,047

(22) Filed: Oct. 16, 2001

(65) Prior Publication Data
US 2003/0072431 A1 Apr. 17, 2003

(51) Int. Cl.[7] ............................................. H04M 3/42
(52) U.S. Cl. ..................... 379/211.01; 379/355.01; 379/355.05; 379/355.08
(58) Field of Search .................. 379/211.01, 216.01, 379/355.01, 355.02, 355.03, 355.04, 355.05, 355.06, 355.07, 355.08

(56) References Cited

U.S. PATENT DOCUMENTS

| | | | | |
|---|---|---|---|---|
| 5,452,353 A | * | 9/1995 | Menezes | 379/355.08 |
| 5,475,743 A | * | 12/1995 | Nixon et al. | 379/355.07 |
| 6,292,557 B1 | * | 9/2001 | Gabara | 379/355.08 |

* cited by examiner

Primary Examiner—Bing Q. Bui
(74) Attorney, Agent, or Firm—Allen, Dyer, Doppelt, Milbrath & Gilchrist, P.A.

(57) ABSTRACT

A called telephone number substitution mechanism is incorporated into the call-routing software employed by the microcontroller of a customer premises-installed communication device, through which digitized voice and data services are supplied to a customer site. The number substitution mechanism automatically selectively modifies digits of an original (dialed) telephone number, as necessary, to conform with the connectivity requirements of the communication link serving the destination device, thereby enabling the call to reach the destination device.

20 Claims, 2 Drawing Sheets

CALL-ROUTING MECHANISM FOR AUTOMATICALLY PERFORMING NUMBER SUBSTITUTION IN AN INTEGRATED ACCESS DEVICE

FIELD OF THE INVENTION

The present invention relates in general to communication systems, and is particularly directed to a called telephone number substitution mechanism, that is incorporatable into the call-routing software employed by the microcontroller of a customer premises-installed digital communication device, such as an integrated access device (IAD) through which time division multiplexed (TDM) and packetized voice and data services are supplied to a customer site. This called number substitution mechanism is operative to automatically selectively modify the digits of an original (dialed) telephone number, as necessary, to conform with the connectivity establishment requirements of the communication link serving the destination device, and thus enable the call to reach the destination device.

BACKGROUND OF THE INVENTION

Digital communication techniques, including but not limited to time division multiplexed (TDM), digital subscriber loop (DSL), and packetized data-based schemes, enable communication service providers to deliver multiple types of digital signalling services to various customer premises equipments. For example, to transport packetized voice and data, the service provider may deploy several different devices, such as asynchronous transfer mode (ATM) switches, digital subscriber line access multiplexers (DSLAMs) and voice gateways, in the signal transport path from a central office to a customer premises-resident device (e.g., IAD).

Since the customer premises device is usually customer-purchased and installed, the service provider does not participate in the customer's choice of what is connected to the link. Still, in order to provide its intended connectivity functionality between customer premises equipment and the public switched telephone network (PSTN), it is necessary that the device's supervisory communications controller conform with the telephone number dialing scheme employed by the network service provider and also that used by the customer premises equipment.

Rather than having to reprovision the data terminal equipment or the PSTN switch—a costly and time-consuming exercise—for optimal flexibility, it would be desirable to provide the user with the capability of modifying (e.g., removing, adding, replacing or substituting) digits of the original number. This would provide for various operational benefits, such as switch by-pass capability, and also avoid the need to reprovisioning attached customer premises or PSTN equipment.

Unfortunately, the customer is usually technically unsophisticated and accustomed to doing nothing more than performing a 'plug-and-play' exercise, so that any change to initial hardware or software parameters constitutes a major hurdle to the successful deployment of a desired service or equipment modification. Indeed, experience has revealed that a very large majority of customers will burden the equipment supplier and/or the service provider with a request for technical support, in the course of configuring or reconfiguring their equipment, regardless of whether the service provider has correctly supplied the information required.

SUMMARY OF THE INVENTION

In accordance with the invention, the ability to adapt the customer's device to variations in number dialing schemes is readily accomplished by a number substitution mechanism executable by the call-routing software employed by the device's microcontroller, through which digital communication service (such as time division multiplexed and packetized voice) is deliverable to a customer site.

Pursuant to a preferred but non-limiting embodiment, the call-routing routine employed by the device communications controller, such as the switch board of an IAD's communications controller, is augmented to incorporate one or more number substitution templates associated with various connectivity paths for the communication ports of the device. Each number substitution template is configured to automatically selectively modify one or more digits of an original telephone number, as necessary, to produce a telephone number that conforms with the call connectivity requirements of the communication link serving the destination device, and thereby enable a call to reach that destination device.

According to the invention, when the digits of an original number are received by the device (e.g., IAD), the call-routing routine will call up from memory a prescribed number substitution template associated with the port to which the number is coupled. In preparation for comparing the digits of the original number with those of the accessed template, a plurality of comparison table fields are loaded with initialization values.

One of these fields—a "best_match_entry" field—is initially reset or cleared. The "best_match_entry" field is used to determine whether the originally received number is to be replaced by a number in the substitution template; if so, this field also specifies which of those numbers is to be substituted for the originally received number. If not, there is no number replacement, and the originally received number is forwarded, 'as is' or unmodified.

A second, "this_entry" field is initially loaded with a first potential substitution number listed in the accessed template. The "this_entry" field is used in the course of stepping through and comparing digits of the received number with those of the respective substitution number entries of the template. A third "number" field is loaded with the originally received number. At the conclusion of the routine, it is the contents of this "number" field that are forwarded as the output number.

Selected digits of the template number in the "this_entry" field are then compared with selected digits of the originally received number to determine whether the currently examined template number more closely matches the originally received number than any previous entry. If the first comparison entry from the number substitution template matches the originally received number, then the contents of the "best_match_entry" field are replaced with the number currently written into the "this_entry" field, and the "this_entry" field is loaded with the next entry in the template. The contents of the "this_entry" field are then examined to determine whether the last entry in the number substitution template has been reached. If not, the routine loops back and proceeds to step through the entirety of the template number substitution list.

As long as one of the potential substitute numbers in the template matches that of the original number (as stored in the "number" field), a number substitution will be carried out and the contents of the "best_match_entry" field substituted for the originally received number contents of the "number" field. This new or replacement number is then forwarded to the associated IAD output port.

However, if no potential substitute number in the template has at least one digit that matches that of the original number, the "best_match_entry" field will still be in its originally cleared condition at the end of the examination of the entire template list; in this event, the originally received number will be forwarded to the associated IAD output port.

Because the number substitution mechanism of the invention is software-based, it provides considerable flexibility in processing the digits of an originally received number and the replacement digits of a substitute number. For example, the invention need not compare all of the digits of the two numbers. Moreover, the number of digits in the originally received number need not be the same as the total number of digits of the template substitute number that is to be forwarded to a downstream path. Either number could have more or less digits than the other. In addition, a substitute number entry may include one or more control flags, such as pause 'commas' embedded with the number contents of the template, that provide for staggered transmission or 'fragmented' transport of the contents substitute number.

DETAILED DESCRIPTION

Before describing in detail the automated number substitution mechanism in accordance with the present invention, it should be observed that the invention resides primarily in a prescribed communication link establishment mechanism, that is embedded in the communications call-routing control software employed by the supervisory communications controller of a digital communication device, such as an integrated access device. Consequently, the invention has been illustrated in the drawings in readily understandable block diagram and associated flow chart format, which show only those specific details that are pertinent to the present invention, so as not to obscure the disclosure with details which will be readily apparent to those skilled in the art having the benefit of the description herein. Thus, the block diagram and flow chart illustrations are primarily intended to illustrate the major components of the invention in a convenient functional grouping, whereby the present invention may be more readily understood.

Figure 1:
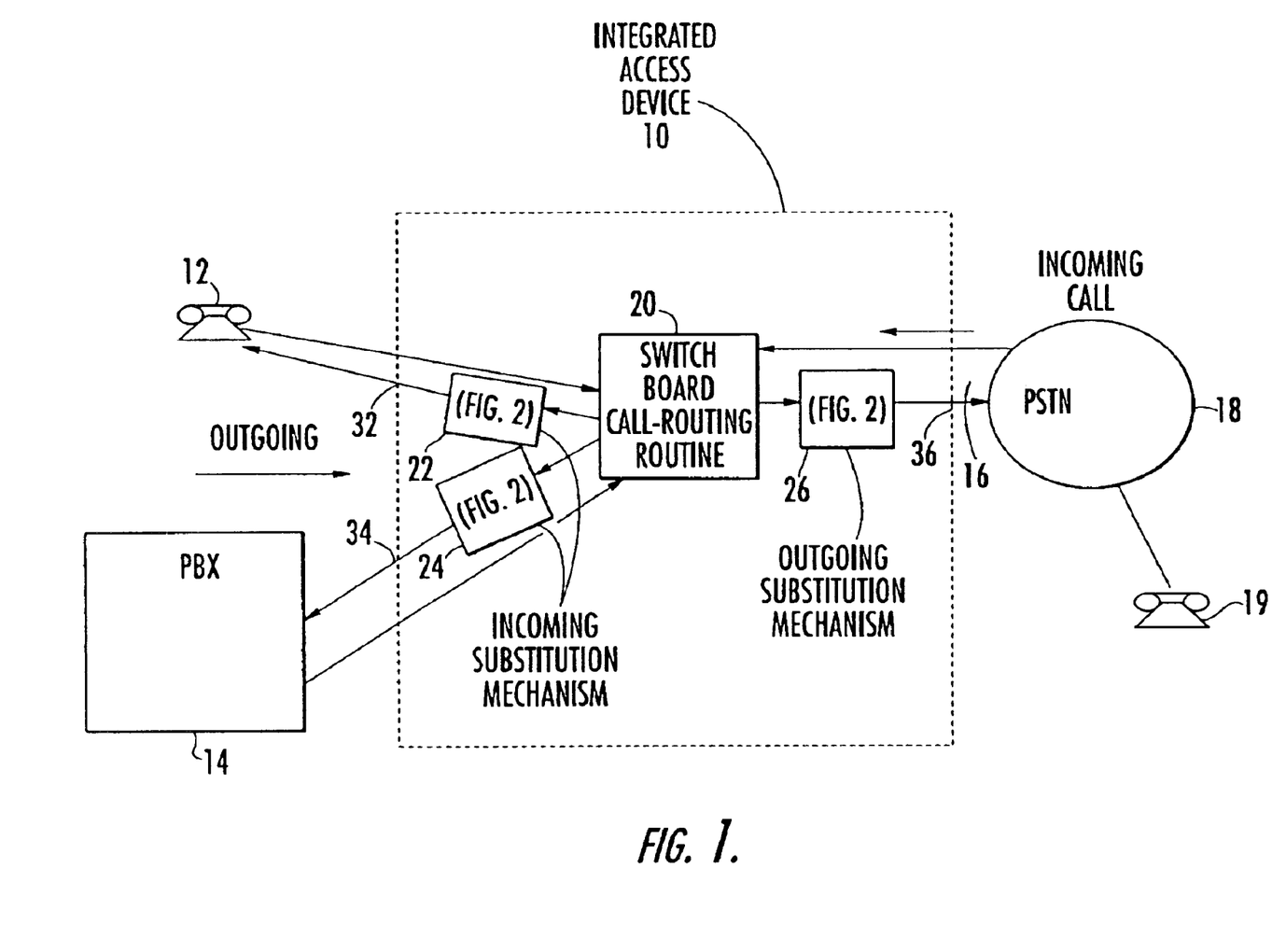
FIG. 1 diagrammatically illustrates a reduced complexity example of a digital telecommunication network, having a communication link coupled from a public switched telephone network to an integrated access device serving customer premises equipment, and incorporating the number substitution mechanism of the present invention.

FIG. 1 is a reduced complexity diagrammatically illustration of the interconnection of customer premises-installed digital communication unit 10, such as an integrated access device (IAD) as a non-limiting example, serving various customer premises equipments (CPEs), for example, a telephone 12 and a private branch exchange 14, via a digital communication link 16 of a communication service provider, through which access to a PSTN 18 (serving a remote customer phone 19) is provided. As a non-limiting example, the digital communication unit 10 may comprise an Atlas 550 IAD, manufactured by Adtran Corp., Huntsville, Ala. It should be observed, however, that the invention is not limited to use with this or any other communication device, but is intended as an augmentation to the communication supervisory control mechanisms employed in communication devices supplied from a variety of telecommunication equipment manufacturers.

To provide call connectivity between the network and customer premises equipment, the device's communications controller contains what is customarily termed a 'switch board' software module 20. This switch board software module is operative to route outgoing and incoming calls to respective ones of the device's communication ports, in accordance with original (e.g., dialed destination) number information contained in the call. The port-steering operation of the call-routing switch board is typically governed by initialization parameters with which the device and the CPE equipment have been provisioned at the time of installation and set-up.

Pursuant to the invention, this call-routing routine is augmented to include one or more number substitution templates or filters associated with various connectivity paths from the switch board to the communication ports of the device, including those on the customer premises side and the network side. In the reduced complexity example shown in FIG. 1, switch board 20 is shown as having three respective number substitution templates or filters 22, 24 and 26, associated with ports 32, 34 and 36, that couple to the telephone 12, PBX 14 and network link 16 with the PSTN.

Each number substitution template serves to automatically selectively modify or replace the digits of an original or incoming (e.g., dialed) telephone number, as necessary, to produce a telephone number that conforms with call connectivity requirements of the communication link serving the destination device, and thereby enables a call to reach that destination device.

Figure 2:
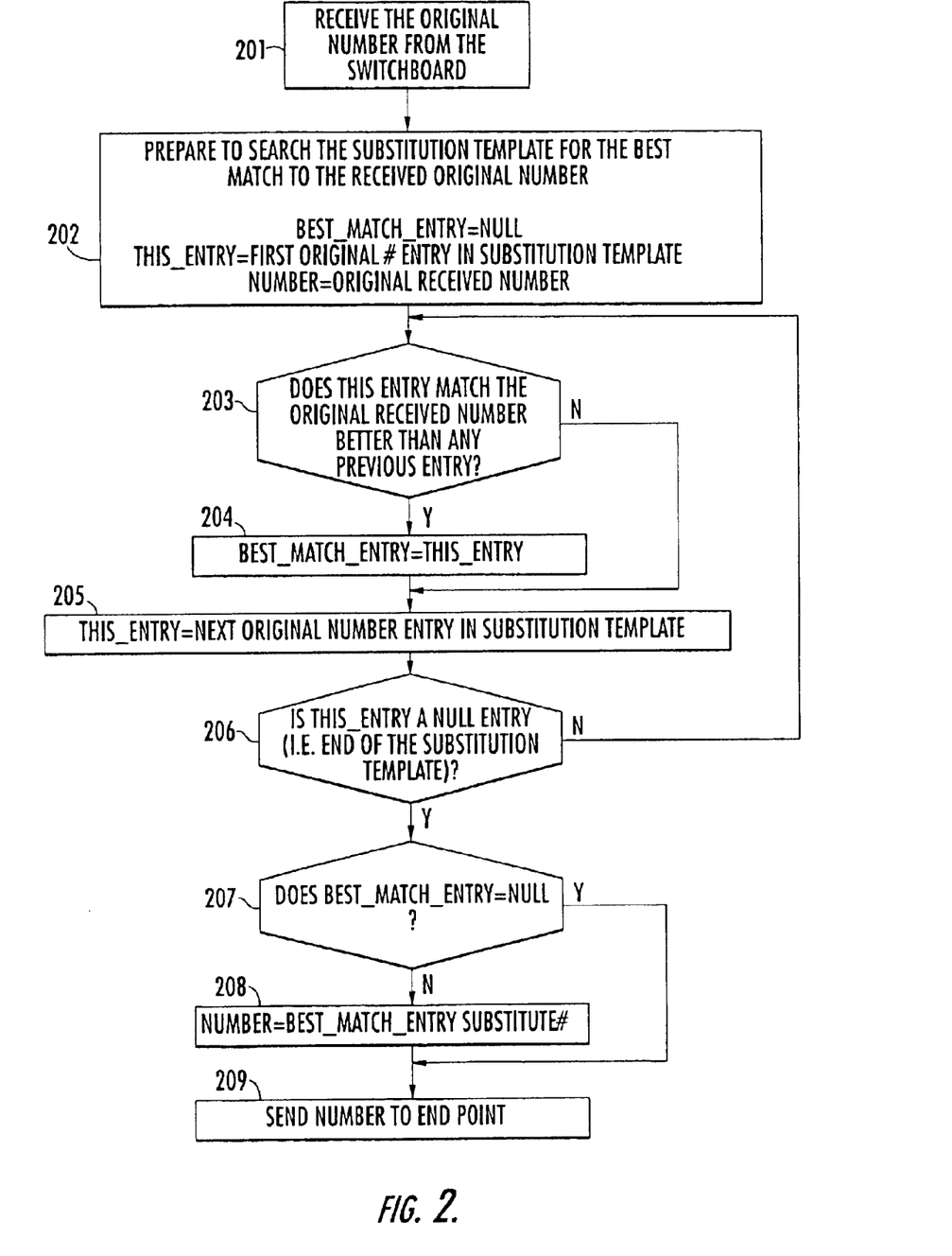
FIG. 2 is a flow chart of the automated number substitution mechanism of the present invention.

Respective steps of the number substitution routine carried out by the call-routing augmentation scheme of the invention are shown in FIG. 2. In accordance with this routine, when the digits of an original number are presented to the device (either from the network or CPE equipment), they are received and captured at initial step 201. In response to receipt of this original number, the routine will call up from memory a prescribed number substitution template that is associated with the port to which the number is applied, and one or more comparison or input entries of which are to be compared with the received number, to determine whether any associated output or substitution entry is to be substituted for the original number. As will be described, the routine accommodates for one or more 'wild card' digits, to provide for a 'best match' of less than all digits of the received number.

In step 202, prior to comparing digits of the original number with input or comparison entries of the accessed number substitution template, plural comparison table fields of the number substitution routine are loaded with initialization values. In particular, a first, "best_match_entry" field is reset/cleared or set to null (all zeroes). As will be described, upon completion of the call substitution routine, the "best_match_entry" field will indicate whether or not the originally received number is to be replaced by a substitution number listed in the output or replacement list of the template and, if so, which replacement entry is to be substituted for the original number.

After stepping through all of the comparison entries of the template, if the "best_match_entry" field still remains a null, it is concluded that there is to be no number substitution or replacement, and the originally received number is forwarded 'as is' or unmodified. On the other hand, if the contents of the "best_match_entry" are not a null after stepping through all of the comparison entries of the template, then the substitution number of the substitution template currently associated with the "best_match_entry" will be substituted for the originally received number.

In addition to clearing the "best_match_entry" field, step 202 also loads a second, "this_entry" field with a first or initial comparison entry from the accessed template. The "this_entry" field is used in the course of stepping through and comparing the digits of the received number with those of respective comparison entries of the number substitution template. Step 202 also loads a third "number" field with the originally received number. It is the contents of this "number" field (which will either be a replacement number or the originally received number) that are forwarded as the output number at the conclusion of the routine.

Upon completion of step 202, the routine transitions to query step 203, which compares the comparison entry currently stored in the "this_entry" field with the originally received number (stored in the "number" field), on a digit-by-digit basis, to determine whether the currently examined comparison entry more closely matches the originally received number than any previous comparison entry listed in the template.

To this end, a numerical value (e.g., 1) may be assigned for each match of a respective digit; where there is no match, a value of 0 is assigned for that digit. In order for the originally received number to "match" the comparison entry of interest, there must be a one-for-one identity of all of the digits of the two numbers, except for wild card digits, which are ignored. Otherwise, a no match condition for that comparison entry is declared. In addition, step 203 is designed to resolve conflicts between various types of wild cards; X (digits 0–9), N (digits 2–9) and $ (any number of characters), by prioritizing the wild cards as follows: N=X>$.

In a preferred embodiment, if each matching digit has a value of '1', the $ is given a value of –½. In this case, therefore, the priority is as follows: 'matching digit'>N= X>$>—'matching digit', so that '1'>0=0>–½>–1. Therefore, count values associated with the following matches for the non-limiting examples may be derived: for 963-7938, the count total=7; for 963-79XX, the count total= 5; for 963-79NX, the count total=5; for 1-NXX-XXX-XXXX, the count total=1; for 1$, the count total=½; for 963-79$, the count total=4.5.

Thus, using a value of '1' per digit match, for a seven digit number with no wild cards ($, N or X), the comparison total must equal seven for a match to have occurred. If one or more wild card digits is present, the digit match total will be less. As a non-limiting illustration, each of comparison entries 123-456X 123-45XX (where X is any digit from 0–9) may be said to "match" the original number 123-4567, since the wild card digits X are ignored. However, the comparison entry 123-456X 'more closely' matches the original number 123-4567, than does the comparison entry 123-45XX, as it produces a larger match value (six digits versus five, for the present example).

Where the currently examined comparison entry more closely matches the originally received number than any previous comparison entry listed in the template, the answer to query step 203 is YES, and the routine steps to step 204. In step 204, the "best_match_entry" field is loaded with the comparison entry in the "this_entry" field, and the routine steps to step 205. On the other hand, if the currently examined comparison entry does not more closely match the originally received number than any previous comparison entry, the answer to query step 203 is NO, and the routine branches to step 205.

In step 205, the "this_entry" field is loaded with the next comparison entry in the number substitution template, and the routine steps to query step 206. In query step 206, the contents of the "this_entry" field are examined to determine whether the last comparison entry in the number substitution template has been reached (represented by a null value for that entry). If not, the answer to query step 206 is NO, and the routine loops back to step 203 and repeats the step and compare sequence, described above.

Eventually, after examination of all of the comparison entries of the number substitution template (which may contain any number of replacement numbers), the last entry (zero) will be reached, causing the answer to query step 206 to be YES, whereupon the routine transitions to query step 207.

In query step 207, the contents of the "best_match_ entry" field are examined for the presence of a null or all zeroes value. As long as one of the comparison entries of the number substitution template has produced a match with the original number (currently stored in the "number" field), then step 204 will have placed that comparison entry in the "best_match_entry" field, making the contents of the "best_match_entry" field non-zero, so that the answer to query step 207 is NO. In this case, the routine transitions to step 208.

In step 208, the originally received number contents of the "number" field are replaced by that one of the output or substitute number entries of the template whose associated comparison entry has produced the best match (currently loaded in the "best_match_entry" field). The routine then steps to step 209, wherein the substitute number is forwarded to the associated device output port.

On the other hand, if no comparison entry in the number substitute template matches the original number, the contents of the "best_match_entry" field are zero, and the answer to query step 207 is YES. In this case, the routine branches directly to step 209, wherein the originally received number of the "number" field (rather than a substitute number) are forwarded to the associated IAD output port.

In order to facilitate an appreciation of the functionality of the number substitution routine of the present invention, non-limiting examples of number substitution templates that may be employed by the processing routine of the invention will now be described with reference to the steps of FIG. 2.

SUBSTITUTION TEMPLATE EXAMPLES

1—Single Number Substitution (Original Number=987-5678; Substitute Number=334-9876)

In the case of a single number substitution, all of the digits of the received original number must match those of a given comparison entry of the template. If there is a one-for-one match of all digits of these two numbers, the comparison entry's substitute or output number will be replaced for that of the original number. Otherwise, the original number will be unmodified. Thus, for the above-listed original number of the present example, the originally received number must match the comparison entry 987-5678 of the accessed number substitution template. If so, the comparison entry's associated substitute number 334-9876 will be substituted for the original number. Otherwise, the digits of the original number 987-5678 will be forwarded 'as-is'.

Referring now to FIG. 2, at step 201, the digits of the original number are received and captured. Next, in step 202, the routine calls up from memory a number substitution template containing the comparison entry (987-5678) and its associated 'to-be-substituted' number (334-9876). In addition, the "number" field is loaded with the originally received number, the "this_entry" field is loaded with a first comparison entry (here 987-5678) of the template, and the "best_match_entry" field is cleared (to all zeroes).

Upon completion of step 202, the routine transitions to query step 203, which compares the comparison entry in the "this_entry" field with the originally received number (in the "number" field), to determine whether the comparison entry more closely matches the originally received number than any previous comparison entry. For the present example, the template contains only one entry (987-5678). Therefore, if the contents of the received number is exactly 987-5678, then the answer to query step 203 will be YES and, in step 204, the currently examined template entry ('this_entry'=987-5678) will be written into the 'best_match' entry field. However, if the contents of the "number" field (the originally received number) do not match the number: 987-5678, the answer to query step 203 will be NO, and there will be no change of the contents (currently zero) of the 'best_match' entry field.

Next, in step 205, the "this_entry" field is loaded with the next comparison entry in the number substitution template, and the routine steps to query step 206. Since, in the present example, the template contains only the single entry (987-5678), the next entry is all zeroes, indicating that the end of the comparison entries of the substitution template has been reached. The answer to query step 206 is therefore YES, and the routine transitions to query step 207.

In query step 207, the "best_match_entry" field is examined for the presence of an all zeroes value. If the originally received number exactly matches the single comparison entry (987-5678) of the present example, then step 204 will have placed that comparison entry in the "best_match_entry" field, making the contents of the "best_match_entry" field non-zero, so that the answer to query step 207 will be NO, and the routine transitions to step 208. In step 208, the originally received number contents of the "number" field (987-5678) are replaced by the substitute number entry (334-9876) whose associated comparison entry (987-5678), currently loaded in the "best_match_entry" field, has produced a 'best' match. The routine then steps to step 209, wherein the number (334-9876) to be substituted for the number 987-5678 is forwarded to the associated device output port.

On the other hand, if the comparison entry in the number substitute template does not match the original number, namely, the received number is some number other than 987-5678, the contents of the "best_match_entry" field will be zero, and the answer to query step 207 is YES. In this case, the routine branches directly to step 209, wherein the originally received number of the "number" field (rather than a substitute number) are forwarded to the associated IAD output port.

2—Range of Substitute Numbers (444-5600 . . . 444-5699) Replacing Range of Original Numbers (555-1200 . . . 555-1299)

The entry in the template would be 555-12XX, 444-56XX; this would automatically present the two ranges to the substitute template logic. In the present example of a range of one hundred substitute numbers, if a received number matches any number within the given range of comparison number entries (here 555-1200 . . . 555-1299) of the template, then a substitute number taken from the range of substitute numbers (444-5600 . . . 444-5699) uniquely associated with that entry will be replaced for that of the original number. Otherwise, the original number will be unmodified. Thus, for example, for the above-listed range, originally received numbers 555-1201, 555-1234, and 555-1278 will be replaced by associated substitute numbers in the replacement range as 444-5601, 444-5634, and 444-5678, respectively.

Referring again to FIG. 2, at step 201, the digits of the original number are received and captured. For purposes of a non-limiting example, the received number will be the number 555-1288. In step 202, the routine calls up from memory the substitution template containing the above substitution range, including each of the 100 comparison entries (555-1200 . . . 555-1299) and their respectively associated 'to-be-substituted' numbers (444-5600 . . . 444-5699). Also, the "number" field is loaded with the originally received number (here 555-1288), the "this_entry" field is loaded with a first comparison entry (e.g., 555-1200) of range contained in the template, and the "best_match_entry" field is cleared (to all zeroes).

Upon completion of step 202, the routine transitions to query step 203, which compares the first comparison entry (555-1200) in the "this_entry" field with the originally received number (555-1288) stored in the "number" field), to determine whether the comparison entry more closely matches the originally received number than any previous comparison entry. For the present example, these two values do not match, so that the answer to query step 203 is NO, and there is no change of the contents (currently zero) of the 'best_match' entry field.

Next, in step 205, the "this_entry" field is loaded with the next comparison entry in the number substitution template (555-1201, in the present example), and the routine steps to query step 206. Since the next entry is not all zeroes, indicating that the end of the comparison entries of the substitution template has not been reached. The answer to query step 206 is therefore NO, and the routine loops back to step 203.

This iterative process is repeated for the next 87 comparison entries in the template until step 203 detects a match between the value 555-1288 that has been loaded into "this_entry" field and the same number in the "number" field. When this happens, the answer to step 203 will become YES, and in step 204, the current comparison entry 555-1288 in the "this_entry" field is written into the 'best_match' entry field. The iterative routine then continues through the remaining comparison entries in the template (555-1289 . . . 555-1299), none of which matches the original number.

Eventually, the last entry (zero) of the substitution template will be reached, causing the answer to query step 206 to be YES, and the routine transitions to query step 207. In query step 207, the "best_match_entry" field is examined for the presence of an all zeroes value. Since the originally received number exactly matches the comparison entry (555-1288), that comparison entry is currently stored in the "best_match_entry" field, making the contents of the "best_match_entry" field non-zero, so that the answer to query step 207 will be NO, and the routine transitions to step 208. In step 208, the originally received number contents of the "number" field (555-1288) are replaced by the substitute number entry (444-5688), and the routine steps to step 209, wherein the substitute the number (444-5688) is forwarded to the associated device output port.

3—Template Containing Multiple Number Ranges (Single Number Substitution (Original Number=987-5678;

Substitute Number=334-9876) and Range of Substitute Numbers (444-5600 . . . 444-5699) Replacing Range of Original Numbers (555-1200 . . . 555-1299))

In this example, there are two template entries: 1) 987-5678 334-9876; and 2) 555-12XX 444-56XX. This third example is a combination of the first and second examples, described above. Here, the template contains two comparison entry ranges, a first of which contains a single number 987-5678 having an associated substitute number 334-5678, and the second of which contains 100 comparison entries 555-1200 . . . 555-1299 having respectively associated numbers 444-5600 . . . 444-5699. In this example, if a received number matches either the number 987-5678 (the lone comparison number of the first range), or any of the comparison number entries (here 555-1200 . . . 555-1299) of the second range, then a substitute number uniquely associated with the matched entry will be replaced for that of the original number, as described above in examples 1 and 2. Otherwise, the original number will be sent unmodified.

4—Modification of Length/Composition of Original Number by Adding a Prefix (e.g., Area Code) to an Original Number In this example, the template is configured as 555-12XX 256-444-56XX. This fourth example illustrates the use of the number substitution template of the invention to automatically prepend a prefix, such as an area code, or a one plus the area code, to an original number. A non-limiting example of where this scheme is particularly useful involves applications, such as interstate urban environments, where dialing requirements have been augmented to require all calls, including local calls, to include the called number's area code, in addition to the customary seven digit number. To this end, the template of the present example contains a seven digit range of comparison entries, respective ones of which have a seven digit range of ten digit substitute numbers, and the first three digits of each of which corresponds to a prepended area code.

For purposes of a reduced complexity, non-limiting illustration, consider the one-hundred number range of the second example, described above. For this example, the prepending template of the fourth example also contains the comparison entries 555-1200 . . . 555-1299. However, its respectively associated substitute numbers is the one-hundred ten digit substitute number set: 256-444-5600 . . . 256-444-5699, where 256 is the prepended area code.

Namely, if the original number matches any of the seven digit comparison number entries (here 555-1200 . . . 555-1299), then a substitute ten digit number having the prefix 256, plus the seven digits uniquely associated with the matched entry will be substituted for the original number, in the same manner described above for the second example. Otherwise, the original number will be sent unmodified. Thus, originally received seven digit numbers 555-1201, 555-1234, and 555-1278, for example, will be replaced by associated ten digit substitute numbers 256-444-5601, 256-444-5634, and 256-444-5678, respectively.

5—Removing Prefix (e.g., 1) from Original Number

The template for this example is: 1-256-555-12XX 256-444-56XX. This fifth example illustrates the use of the number substitution template of the invention to automatically remove or excise a number, such as a long distance '1' digit from the front end of an original number, such as from a ten digit number that uses the area code but is not tariffed as a long distance call, eliminating the use of the precursor '1'. In this case, the template contains a ten digit range of comparison entries, the first digit of which is the precursor '1', and respective ones of which have an eleven digit range of ten digit substitute numbers, comprised of the area code followed by a seven digit number.

Again, as a reduced complexity, non-limiting illustration, consider the one-hundred number range of the second example, described above, each number of which also includes a three digit area code prepended by a '1' digit. For this example, the excising template of the fifth example contains a set of 100, eleven digit comparison entries 1-256-555-1200 . . . 1-256-555-1299, respectively associated substitute numbers of which is the one-hundred ten digit substitute number set: 256-444-5600 . . . 256-444-5699.

Thus, if the original number matches any of the eleven digit comparison number entries (here 1-256-555-1200 . . . 1-256-555-1299), then a substitute ten digit number having the prefix 256, plus the seven digits uniquely associated with the matched entry will be substituted for the original number, in the same manner described above for the fourth second example. Otherwise, the original number will be sent unmodified. Thus, originally received seven digit numbers 1-256-555-1201, 1-256-555-1234, and 1-256-555-1278, for example, will be replaced by associated ten digit substitute numbers 256-444-5601, 256-444-5634, and 256-444-5678, respectively, from each of which the precursor '1' has been removed.

6—Multiple Different Sub-Ranges of Substitute Numbers (444-5600 . . . 444-5629; 334-6740 . . . 334-6749; 444-5640 . . . 444-5699) Replacing Respective Sub-Ranges (555-1200 . . . 555-1229; 555-1230 . . . 555-1239; 555-1240 . . . 555-1299) Within Common Range of Original Numbers (555-1200 . . . 555-1299)

This template has two entries: 1) 555-12XX 444-56XX; and 2) 555-123X 334-674X. This example is a derivative of the second example containing a range of original numbers having respective subsets or subranges that are to be replaced by associated substitute numbers falling in multiple (e.g., two) subranges or sets. In the present example, if a received number matches any number within the overall range of comparison number entries (here 555-1200 . . . 555-1299) of the template, then a substitute number taken from one of the above-listed subranges of substitute numbers (444-5600 . . . 444-5629; 334-6740 . . . 334-6749; 444-5640 . . . 444-5699) associated with the subrange containing the comparison entry will be replaced for original number. Otherwise, the original number will be unmodified.

Thus, for the above-listed sub-ranges, originally received numbers 555-1201 and 555-1278 falling within the subrange of numbers (555-1200 . . . 555-1229 and 555-1240 . . . 555-1299) within the overall range of numbers (555-1200 . . . 555-1299) will be replaced by respective substitute numbers 444-5601 and 444-5678, whereas an originally received number 555-1235 within the subrange of numbers (555-1230 . . . 555-1239) of the overall range of numbers (555-1200 . . . 555-1299) will be replaced by the substitute number 334-6745. These template replacement relationships may be expressed as: 555-12XX==>444-56XX, and 555-123X==>334-674X.

It should be noted that the two subranges of the template have different code resolutions. The comparison entry subrange 555-12XX has a five digit resolution, while the comparison entry subrange 555-123X has a six digit resolution. In the course of execution of the routine of FIG. 2, a 'best_match' entry for an original number 555-1234 would produce a match value of five from the lower resolution subrange 555-12XX (five exactly matching digits (55512), but would produce a match value of six from the higher resolution subrange 555-123X (six exactly matching digits (555123). Therefore, when the answer to query step 206 is YES (all comparison entries in the template have been processed), step 204 will have loaded the 'best_match_entry' field with the higher resolution range comparison entry 555-1234 producing the larger valued match (six vs. five digits), whose associated substitute number is the number 334-6734. Consequently, the substitute number will be the number 334-6734.

7—Multiple Modifications of Multiple Original Numbers

This seventh example illustrates the use of the number substitution template of the invention to perform a variety of modifications of different ranges, lengths and formats of original numbers. For example, in the case of an outgoing call to the PSTN, the service provider may require that it always receive ten digits, including area code, even in the case of a local call. The template-based routine of the invention allows a calling party, who may be accustomed to dialing only seven digits for a local call, to continue to do so, with one or more prepended codes, such as an area code, an access or 'PIC' code associated with a CLEC, and the like, to be automatically provided by the template. In this case, the prepended code is not part of the digit comparison. In a complementary manner, the template provides for selectively ignoring one or more digits of the originally received number, such a precursory '1' used to initiate a long distance call.

In the present example, the template is to perform the following substitutions.

A—Any original (local seven digit) number in the range of 200-0000 through 999-9999 is to be prepended with the area code 256 and thereby translated to a corresponding number within the ten digit number range 256-200-0000 through 256-999-9999. Here, the template entry is NXX-XXX 256=NXX-XXX.

B—However, if the original digits are '911' (corresponding to an emergency call, but falling within the subrange 911-0000 . . . 911-9999 within the above range 200-0000 . . . 999-XXXX), then those same digits '911' are to be sent 'as is'. The template entry is: 911 911.

C—Any (eleven digit long distance) original number in the range 1-205-200-0000 through 1-205-999-9999 is to have the precursor '1' excised to yield a corresponding number in the ten digit number range 205-200-0000 through 205-999-9999. The template entry is: 1-205-NXX-XXXX 205-NXX-XXXX.

D—Any original number $ (where $=of any number of characters), that begins with a '1' and does not fall within the previous number set (1-205-200-0000 through 1-205-999-9999), is to be modified so that its precursor code is '10103211' rather than '1'. The template entry is: 1$ 10103211$.

E—However, if the original number is the number '1411' (local directory assistance in some localities and falling within the set 1$), then that number (1411) is to be translated to the seven digit (local directory assistance) number '555-1212'. The template entry is: 1411 555-1212.

Case A is handled in the same manner as the prepending of the area code of the fourth example, and can be expressed as the translation NXX-XXXX==>256-NXX-XXXX (where N is any digit from 2–9). However, because the emergency call number (911) of case B falls within the range of original numbers of case A, there is a potential conflict. The routine of FIG. 2 readily resolves this potential conflict in favor of case B, in the manner of the sixth example, described above, since case B has a greater code resolution (three digits (911) than case A (which has no resolution).

Namely, in the course of execution of the routine of FIG. 2, a 'best_match' entry for an original number 911-1234 would produce a match value of zero from the lower resolution subrange NXX-XXXX, but would produce a match value of three from the higher resolution subrange 911 (three exactly matching digits (911). Therefore, when the answer to query step 206 is YES (all comparison entries in the template have been processed), step 204 will have loaded the 'best_match_entry' field with the higher resolution range comparison entry 911 producing the larger valued match (three vs. zero digits), whose associated substitute number is the number 911. Thus, the emergency code 911 will be sent.

Case C is handled in the same manner as the excising of the area code of the fifth example, and can be expressed as the translation 1-205-NXX-XXXX==>205-NXX-XXXX. However, because an original number of case C may fall within the range of original numbers of case D, there is a potential conflict. The number substitution routine of FIG. 2 resolves this potential conflict in favor of case C, since a range of characters is given priority in step 203, in the case of a match conflict with wild cards N and X, as described previously. As a consequence, once all comparison entries have been processed (the answer to query step 206 is YES), step 204 will have loaded the 'best_match_entry' field with the higher priority entry 1-205-NXX-XXXX, whose associated substitute number is the number 205-NXX-XXXX. Therefore, the number substitute 1010321$ will be sent.

The conflict between Case E and case D is handled by step 203 in substantially the same manner as the conflict between case B and case A, described above. Namely, the routine of FIG. 2 resolves the conflict in favor of case E, in the manner of the sixth example, described above, since case E has a greater code resolution (four digits (1411) than case D (which has a code resolution of one digit (1)). Therefore, once all comparison entries have been processed (the answer to query step 206 is YES), step 204 will have loaded the 'best_match_entry' field with the higher priority entry 1411, whose associated substitute number is the number 555-1212. Therefore, the substitute number 555-1212 will be sent.

As noted above, each of the digits of an original number may be compared with a corresponding digit of successive template entries or accommodate wild card digits ($, N, X). Advantageously, as the number substitution mechanism of the invention is software-based, it provides considerable flexibility in processing received digits of an original number and the replacement digits of a substitute number. Thus, as can be seen from the foregoing examples, it is not necessary to compare all of the digits of the two numbers, and the number of digits in the originally received number need not be the same as that of the template substitute number that is to be forwarded to a downstream path. Either number could have more or less digits than the other.

Also, the manner in which the substitute number is forwarded over the outgoing path of interest may be readily defined in accordance with number processing requirements of the called circuit. Thus, the substitute number entry may include one or more control flags (such as pause 'commas') embedded with the number contents of the template, to provide for staggered transmission or 'fragmented' transport of the contents substitute number. This allows a calling party, upon initially placing a call, to enter one or more auxiliary numeric digits (such as an extension number)

without having to wait for a prompt (such as that provided by an automated attendant) for such digits by the destination circuit, and thus provide for automatic extension dialing.

As will be appreciated from the foregoing description, the telephone number substitution mechanism of the present invention is readily incorporatable into the call-routing software of a microcontroller of a customer premises-installed communication device, so as enable the digits of an original telephone number to be automatically modified or replaced as necessary, to conform with the connectivity requirements of the communication link serving a destination device. As a result, the invention provides a user friendly mechanism to accommodate changes to the telephone numbers and number formats employed by either a PSTN infrastructure or those of customer premises equipment, without having to reconfigure equipment at either a (central office) switch or the customer site.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. A method for enabling a digital communication device to provide call connectivity therethrough of a call, that is coupled to a first port of said digital communication device and has a destination telephone number, to a second port of said digital communication device for delivery to a communication circuit intended to be reached by said destination telephone number, comprising the steps of:
   (a) providing said digital communication device with a called number substitution mechanism that is operative to automatically selectively modify any of all the digits of which said destination telephone number is comprised;
   (b) processing said destination telephone number of said call, in accordance with said called number substitution mechanism, and selectively modifying said destination telephone number to the extent necessary to produce an output telephone number that conforms with connectivity requirements for said communication circuit; and
   (c) coupling said output telephone number to said second port of said digital communication device.

2. The method according to claim 1, wherein said digital communication device comprises an integrated access device.

3. The method according to claim 1, wherein, in step (b), said called number substitution mechanism is operative to compare said destination telephone number with a plurality of potential substitute telephone numbers, and wherein step (c) comprises, in response to one of said plurality of potential substitute telephone numbers satisfying a prescribed relationship with said destination telephone number, coupling said one of said plurality of potential substitute telephone numbers as said output telephone number to said second port of said digital communication device.

4. The method according to claim 1, wherein, in step (b), said called number substitution mechanism is operative to compare said destination telephone number with a plurality of potential substitute telephone numbers, and wherein step (c) comprises, in response to one of said plurality of potential substitute telephone numbers satisfying a prescribed relationship with said destination telephone number, coupling said one of said plurality of potential substitute telephone numbers as said output telephone number to said second port of said digital communication device, but in response to none of said plurality of potential substitute telephone numbers satisfying said prescribed relationship with said destination telephone number, coupling said destination telephone number as said output telephone number to said second port of said digital communication device.

5. The method according to claim 1, wherein, in step (b), said called number substitution mechanism is operative to compare said destination telephone number with a plurality of potential substitute telephone numbers, and wherein step (c) comprises coupling that one of said plurality of potential substitute telephone numbers, which most closely matches said destination telephone number, as said output telephone number to said second port of said digital communication device, but in response to none of said plurality of potential substitute telephone numbers matching said destination telephone number, coupling said destination telephone number as said output telephone number to said second port of said digital communication device.

6. The method according to claim 1, wherein said called number substitution mechanism contains a plurality of potential substitute telephone numbers, and wherein step (c) comprises coupling one of said plurality of potential substitute telephone numbers as said output telephone number to said second port of said digital communication device.

7. The method according to claim 1, wherein said output telephone number has a different number of digits than said destination telephone number.

8. The method according to claim 1, wherein said output telephone number has the same number of digits as said destination telephone number.

9. For use with a communications controller of a digital communication device that is configured to enable a customer of a communication service provider to conduct time division multiplexed and packetized voice and data communications with a digital communications switch of a digital telecommunications network, said communications controller containing a call routing mechanism that provides call connectivity of a call, that is coupled to a first port of said digital communication device and has a destination telephone number, to a second port of said digital communication device for delivery to a communication circuit intended to be reached by said destination telephone number, a called number substitution mechanism comprising:
   memory containing a plurality of potential substitute telephone numbers; and
   a telephone number comparator routine that is operative to compare said destination telephone number with said plurality of potential substitute telephone numbers stored in memory, and selectively modify any of all of the digits of which said destination telephone number is comprised to the extent necessary to produce an output telephone number that conforms with connectivity requirements for said communication circuit.

10. The called number substitution mechanism according to claim 9, wherein said digital communication device comprises an integrated access device.

11. The called number substitution mechanism according to claim 9, wherein said telephone number comparator routine is operative to cause one of said plurality of potential substitute telephone numbers to be coupled as said output telephone number to said second port of said digital communication device.

12. The called number substitution mechanism according to claim 11, wherein said output telephone has a different number of digits than said destination telephone number.

13. The called number substitution mechanism according to claim 9, wherein said telephone number comparator routine is operative, in response to one of said plurality of potential substitute telephone numbers satisfying a prescribed relationship with said destination telephone number, to cause said one of said plurality of potential substitute telephone numbers to be coupled as said output telephone number to said second port of said digital communication device.

14. The called number substitution mechanism according to claim 9, wherein said telephone number comparator routine is operative, in response to one of said plurality of potential substitute telephone numbers satisfying a prescribed relationship with said destination telephone number, to cause said one of said plurality of potential substitute telephone numbers to be coupled as said output telephone number to said second port of said digital communication device, but in response to none of said plurality of potential substitute telephone numbers satisfying said prescribed relationship with said destination telephone number, to cause said destination telephone number to be coupled as said output telephone number to said second port of said digital communication device.

15. The called number substitution mechanism according to claim 9, wherein said telephone number comparator routine is operative to couple that one of said plurality of potential substitute telephone number which most closely matches said destination telephone number as said output telephone number to said second port of said digital communication device, but in response to none of said plurality of potential substitute telephone numbers matching said destination telephone number, to cause said destination telephone number to be coupled as said output telephone number to said second port of said digital communication device.

16. The called number substitution mechanism according to claim 9, wherein said output telephone number has a different number of digits than said destination telephone number.

17. The called number substitution mechanism according to claim 9, wherein said output telephone number has the same number of digits as said destination telephone number.

18. A telephone number substitution mechanism for use with call-routing software of an integrated access device through which time division multiplexed and packetized voice and data services are supplied, and being configured to automatically modify any of all of the digits of which an original telephone number is comprised of a call to an input port of said integrated access device as necessary to conform with the connectivity requirements of a communication link from an output port of said integrated access device to a called telecommunication circuit.

19. The telephone number substitution mechanism according to claim 18, and comprising memory containing a plurality of potential substitute telephone numbers, and a telephone number comparator routine for said call-routing software and being operative to compare a destination telephone number of said call with said plurality of potential substitute telephone numbers stored in memory, and to selectively modify said destination telephone number to the extent necessary to produce an output telephone number at said output port that conforms with connectivity requirements for said telecommunication circuit.

20. The telephone number substitution mechanism according to claim 18, wherein said telephone number comparator routine is operative to cause one of said plurality of potential substitute telephone numbers to be coupled as said output telephone number to said output port.

* * * * *